United States Patent
Kim et al.

(10) Patent No.: US 8,767,798 B2
(45) Date of Patent: Jul. 1, 2014

(54) PHASED SPREADING SCHEME-BASED TRANSMISSION APPARATUS AND METHOD OF OPERATING THE SAME

(75) Inventors: Youn-Tae Kim, Daejeon (KR); Kun-Ho Park, Jeollanam-do (KR); Jang-Myoung Kim, Gwangju (KR); Min-Joo Jeong, Gwangju (KR); Chang-Hee Hyoung, Daejeon (KR); Jung-Hwan Hwang, Daejeon (KR); Sung-Weon Kang, Daejeon (KR)

(73) Assignee: Industry-Academic Cooperation Foundation, Chosun University (KR)

( * ) Notice: Subject to any disclaimer, the term of this patent is extended or adjusted under 35 U.S.C. 154(b) by 123 days.

(21) Appl. No.: 13/458,157

(22) Filed: Apr. 27, 2012

(65) Prior Publication Data

US 2013/0243042 A1    Sep. 19, 2013

(30) Foreign Application Priority Data

Mar. 13, 2012    (KR) ......................... 10-2012-0025457

(51) Int. Cl.
*H04B 1/00*    (2006.01)
(52) U.S. Cl.
USPC ........................................................ 375/146

(58) Field of Classification Search
USPC .......... 375/146, 130, 260, 295, 299; 370/280, 370/329
See application file for complete search history.

(56) References Cited

U.S. PATENT DOCUMENTS

| 5,946,356 A | 8/1999 | Felix et al. |
| 6,167,037 A | 12/2000 | Higuchi et al. |
| 2005/0025098 A1* | 2/2005 | Terabe .......................... 370/332 |
| 2005/0169351 A1* | 8/2005 | Iida ................................ 375/146 |

FOREIGN PATENT DOCUMENTS

| JP | 2001-510959 | 8/2001 |
| KR | 100311968 | 12/2001 |

* cited by examiner

*Primary Examiner* — Khai Tran
(74) *Attorney, Agent, or Firm* — The Farrell Law Firm, P.C.

(57) ABSTRACT

There are provided a phased spreading scheme-based transmission apparatus and a method of operating the same. The phased spreading scheme-based transmission apparatus includes a spreading unit performing a first spreading operation of defining a first spreading code and spreading an input signal by using the defined first spreading code in response to a control signal defining a spreading coefficient, and a second spreading operation of selecting a second spreading code based on the control signal defining the spreading coefficient and spreading an input signal by using the selected second spreading code, the first and second spreading codes having different spreading coefficients.

20 Claims, 10 Drawing Sheets

PHASED SPREADING SCHEME-BASED TRANSMISSION APPARATUS AND METHOD OF OPERATING THE SAME

PRIORITY

This application claims the priority under 35 U.S.C. §119 to Korean Patent Application No. 2012-0025457, which was filed on Mar. 13, 2012, in the Korean Intellectual Property Office, the entire disclosure of which is incorporated herein by reference.

BACKGROUND OF THE INVENTION

1. Field of the Invention

The present invention relates to a phased spreading scheme-based transmission apparatus and a method of operating the same, derived from results of research conducted as part of CRH for human, cognition and environment-technology fusion-type growth engine project for the Ministry of Education, Science and Technology [Grant Number: 2011K000662, Title: High Speed Human Body Communication and Human Body Medium Electricity Transmission Technique Development].

2. Description of the Related Art

In general, a spreading scheme has been widely used in wireless communications technology in order to secure a stable transfer path for a signal and signal robustness in a channel environment having noise and an interference signal. However, in a wireless communications technology according to the related art, an unified operation of a spreading scheme, that is, data spreading based on one spreading code, is used while being required to undertake complicated operations such as wireless network search and selection, and the like, in order for network formation followed thereby.

SUMMARY OF THE INVENTION

An aspect of the present invention provides a phased spreading scheme-based transmission apparatus and a method of operating the same.

According to an aspect of the present invention, there is provided a phased spreading scheme-based transmission apparatus including: a spreading unit performing a first spreading operation of defining a first spreading code and spreading an input signal by using the defined first spreading code in response to a control signal defining a spreading coefficient, and a second spreading operation of selecting a second spreading code based on the control signal defining the spreading coefficient and spreading an input signal by using the selected second spreading code, the first and second spreading codes having different spreading coefficients.

According to another aspect of the present invention, there is provided a phased spreading scheme-based transmission apparatus including: a spreading unit having a first spreading operation of defining a first spreading code and spreading an input signal by using the defined first spreading code in response to a control signal defining a spreading coefficient, and a second spreading operation of selecting a second spreading code based on the control signal defining the spreading coefficient and spreading an input signal by using the selected second spreading code, the first and second spreading codes having the same spreading coefficient and differing amounts of spreading codes.

According to another aspect of the present invention, there is provided a method of operating a phased spreading scheme-based transmission apparatus, including: defining a first spreading code; transmitting the defined first spreading code to a receiving device; selecting a second spreading code according to a spreading coefficient; and transmitting the selected second spreading code to the receiving device, the first and second spreading codes having different spreading coefficients.

According to another aspect of the present invention, there is provided a method of operating a phased spreading scheme-based transmission apparatus, including: defining a first spreading code; transmitting the defined first spreading code to a receiving device; selecting a second spreading code according to a spreading coefficient; and transmitting the selected second spreading code to the receiving device, the first and second spreading codes having the same spreading coefficient and the differing amounts of spreading codes.

In addition, the inventive characteristics are not all described above, but various characteristics, strengths and effects of the invention may be understood more specifically with reference to the detailed description of the embodiments below.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS OF THE PRESENT INVENTION

Figure 1:
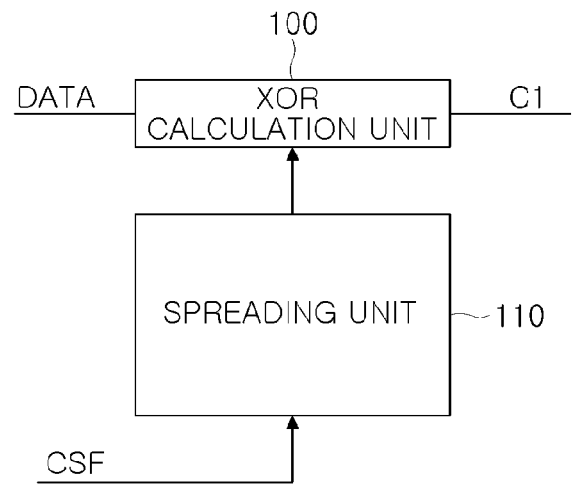
FIG. 1 is a block diagram showing a configuration corresponding to a first spreading operation of a phased spreading scheme-based transmission apparatus according to an embodiment of the present invention.

Embodiments of the present invention will now be described in detail with reference to the accompanying drawings, such that those having ordinary skill in the art to which the invention pertains could easily implement the embodiments described herein. However, it should be noted that the spirit of the present invention is not limited to the embodiments set forth herein and that those skilled in the art and understanding the present invention could easily accomplish retrogressive inventions or other embodiments included in the spirit of the present invention by the addition, modification, and removal of components within the same spirit, but those are to be construed as being included in the spirit of the present invention.

Further, when it is determined that a detailed description of the known art related to the present invention may obscure the gist of the present invention, a detailed description thereof will be omitted.

Hereinafter, according to an embodiment of the present invention, a phased spreading scheme-based transmission apparatus, transmitting data by applying different spreading schemes to a network formation operation and a data transmission operation performed after performing the network formation operation, and a method of operating the same, will be described.

In the network formation operation, a large amount of data is not necessary and a scheme in which a device is recognized by allowing devices to be connected adjacently to each other may be used, and thus, data may be transmitted by using near field communications. In addition, in the network formation operation, in a case in which a channel is formed in a human body, since a signal loss according to a frequency has a different value according to a frequency, narrowband communications may secure the quality of communications. Further, in the data transmission operation after the network formation, data may be transmitted by using wireless communications or high speed communications in order to obtain high speed data transmissions.

Hereinafter, according to an embodiment of the present invention, provided are a transmission apparatus for phased spreading of data to be transmitted through a first spreading operation in which data to be transmitted before network formation, that is, a signal for network formation, is spread by using a first spreading code appropriate to a narrowband communications channel or a near field communications channel to transmit the data through the narrowband communications channel or the near field communications channel and a second spreading operation in which data to be transmitted after the network formation is spread by using a second spreading code appropriate to a high speed communications channel or a wireless communications channel to transmit the data through the high speed communications channel or the wireless communications channel; and a method of operating the same. Here, the first and second spreading codes may have different spreading coefficients. The spreading coefficient refers to the number of chips configuring a spreading code, that is, a code length, which is determined by a channel environment, and has a value equal to the number of usable codes. The spreading coefficient may be confirmed through a control signal CSF defining the spreading coefficient.

With regard to a basic configuration of the phased spreading scheme according to an embodiment of the present invention, a spreading code may be used in the first spreading operation such that an output signal has narrowband characteristics, and in the second spreading operation, more spreading codes than in the first spreading operation may be used therein for relatively high speed data transmissions. The first spreading operation may be performed by using a spreading code for narrowband communications, and in a case in which a single spreading code is used, the first spreading operation may be performed by mapping input information and the single spreading code with each other through a phase inverter. That is, the first spreading operation may be performed by changing a phase of a spreading code according to input information. Here, the phase inverter may be simply configured by using an XOR calculation unit. In a case in which two spreading codes are used, input information digits, 0 and 1, may be mapped with each spreading code. Hereinafter, a narrowband communications method of the first spreading operation using one spreading code will be described by way of an example, but is not limited thereto.

FIG. 1 is a block diagram showing a configuration corresponding to a first spreading operation of a phased spreading scheme-based transmission apparatus according to an embodiment of the present invention. As shown in FIG. 1, a phased spreading scheme-based transmission apparatus may include an exclusive OR (XOR) calculation unit 100 and a spreading unit 110, such that data for transmission thereby is spread based on a first spreading code.

Referring to FIG. 1, the XOR calculation unit 100 may receive a data symbol for transmission thereby and spread the received data symbol by using a first spreading code provided from the spreading unit 110. As such, the data symbol spread by the first spreading code may be transmitted to a receiving device through a narrowband communications channel. At this time, when the received data has a value of '0', the XOR calculation unit 100 may spread a corresponding data symbol by using the first spreading code as it is. Meanwhile, when the received data has a value of '1', the XOR calculation unit 100 may invert a phase of the first spreading code and spread a corresponding data symbol by using the first spreading code having been inverted with regard to the phase thereof. As described above, the received data symbol may be represented by using one spreading code by way of the XOR calculation unit 100 in the first spreading operation. According to the embodiment of the present invention, the first spreading code may be used for spreading data to be transmitted before network formation, that is, a signal for network formation. In other words, the first spreading code may be used for the network formation. Here, a phase inversion of the first spreading code may be implemented through a phase inverter. The present invention will describe a case in which a phase inverter is implemented by using the XOR calculation unit 100 performing an XOR calculation by way of an example.

With respect to the spreading unit 110, when a code having a greatest number of transitions among spreading codes having orthogonality is previously defined as the first spreading code appropriate to a narrowband communications channel, the spreading unit 110 may verify a spreading coefficient defined by the control signal CSF. When the verified spreading coefficient has a value of '1' or '0', the spreading unit 110 may provide the previously defined first spreading code to the XOR calculation unit 100. As such, as the first spreading code is assigned as a code having a greatest number of transitions among the spreading codes having orthogonality, a frequency spectrum occupied by the first spreading code may be formed to be relatively narrow and may be configured to have a binary phase-shift keying (BPSK) type narrowband frequency spectrum.

Figure 2:
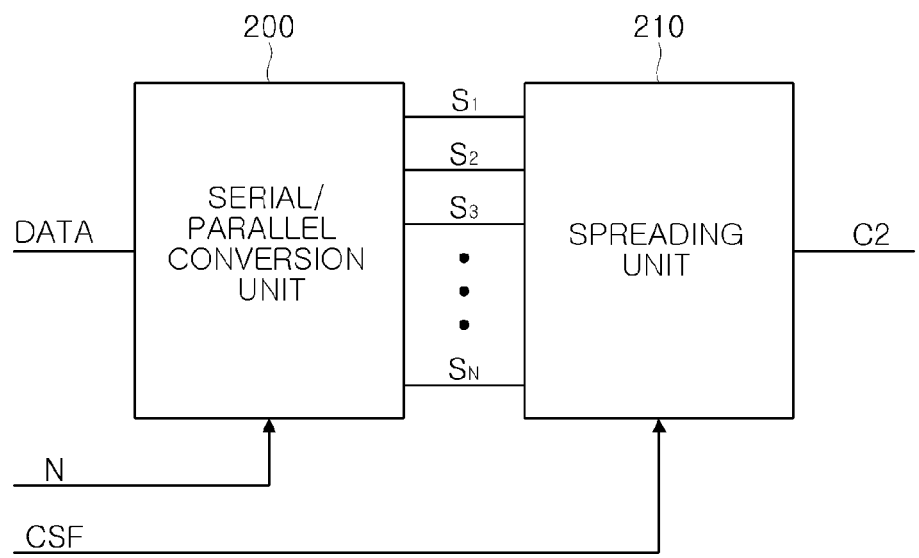
FIG. 2 is a block diagram showing a configuration corresponding to a second spreading operation of a phased spreading scheme-based transmission apparatus according to an embodiment of the present invention.

FIG. 2 is a block diagram showing a configuration corresponding to a second spreading operation of a phased spreading scheme-based transmission apparatus according to an embodiment of the present invention.

As shown in FIG. 2, the phased spreading scheme-based transmission apparatus may include a serial/parallel conversion unit 200 and a spreading unit 210, such that data for transmission thereby may be spread, based on a second spreading code.

With reference to FIG. 2, the serial/parallel conversion unit 200 may convert scrambled serial data for transmission thereby into the N-number of parallel pieces of data according to a control signal N defining a conversion ratio and may output the converted data. Here, the N-number of pieces of output parallel data may configure one data symbol.

In the spreading unit 210, the N-number of pieces of parallel data may be received from the serial/parallel conversion unit 200, a spreading coefficient defined by the control signal CSF may be verified, spreading codes having orthogonality corresponding to the verified spreading coefficients may be generated, one of the generated spreading codes may be optionally selected as a second spreading code appropriate to a high speed communications channel, and then, a data symbol from the serial/parallel conversion unit 200 may be spread by using the second spreading code. Here, the spreading coefficient defined by the control signal CSF may be set to become M ($=2^N$) or more. For example, when N=4, the spreading unit 210 may receive four pieces of parallel data from the serial/parallel conversion unit 200. Here, since the number of compositions of spreading codes selectable through the four pieces of parallel data is 16 ($=2^4$), the control signal CSF may be set to have a value of 16 ($=2^4$) or more, such that 16 ($=2^4$) or more spreading codes having orthogonality may be generated by the spreading unit 210. When the control signal CSF has a value of 16, the spreading unit 210 may generate 16 spreading codes having orthogonality and one spreading code thereof may be optionally selected as the second spreading code. When the control signal CSF has a value of 64, a process of first selecting 16 spreading codes from among all 64 spreading codes may be additionally required, and to this end, control bits for selecting a spreading code group may be configured.

As such, the data symbol spread by the second spreading code may be transmitted to the receiving device through the high speed communications channel. According to the embodiment of the present invention, the second spreading code may be used for spreading of data to be transmitted after network formation. That is, the second spreading code may be used for the high speed transmission of data. In order to transmit data at a relatively high speed, the amount of information to be processed once should be relatively high, and to this end, a relatively large amount of spreading codes may be necessary. As a result, an occupied band width of the signal output through the spreading unit may be increased.

Figure 3:
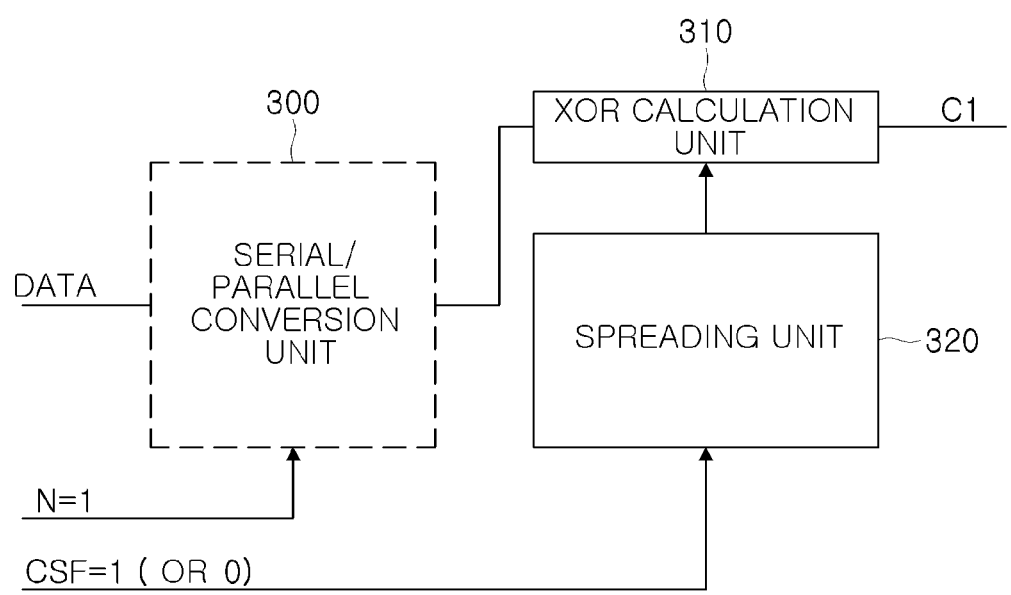
FIG. 3 is a block diagram showing another configuration corresponding to the first spreading operation of a phased spreading scheme-based transmission apparatus according to an embodiment of the present invention.

FIG. 3 is a block diagram showing another configuration corresponding to a first spreading operation of a phased spreading scheme-based transmission apparatus according to an embodiment of the present invention.

As shown in FIG. 3, the phased spreading scheme-based transmission apparatus may include a serial/parallel conversion unit 300, an XOR calculation unit 310, and a spreading unit 320, such that data for transmission thereby may be spread, based on a first spreading code.

With reference to FIG. 3, the serial/parallel conversion unit 300 may output scrambled serial data for transmission thereby as it is to the XOR calculation unit 310. To this end, the control signal N defining a conversion ratio may be input as a value of '1' or '0', and accordingly, the serial/parallel conversion unit 300 may convert serial data into one piece of parallel data and output the converted data to the XOR calculation unit 310. Here, the output one piece of parallel data may configure one data symbol. According to the embodiment of the present invention, the first spreading code may be used for a spreading of data to be transmitted before the network formation, that is, a signal for network formation. That is, the first spreading code may be used for the network formation.

The XOR calculation unit 310 may spread a data symbol from the serial/parallel conversion unit 300 by using the first spreading code provided from the spreading unit 320. As such, the data symbol spread by the first spreading code may be transmitted to the receiving device through a narrowband communications channel. At this time, when data input from the serial/parallel conversion unit 300 has a value of '0', the XOR calculation unit 310 may spread a corresponding data symbol by using the first spreading code as it is. Meanwhile, when the data input from the serial/parallel conversion unit 300 has a value of '1', the XOR calculation unit 310 may invert a phase of the first spreading code and spread a corresponding data symbol by the first spreading code having been inverted with regard to the phase thereof.

With respect to the spreading unit 320, when a code having a greatest number of transitions among spreading codes having orthogonality is previously defined as the first spreading code appropriate to a narrowband communications channel, a spreading coefficient defined by the control signal CSF is verified and then the verified spreading coefficient has a value of '1' or '0', the previously defined first spreading code may be provided to the XOR calculation unit 310.

Figure 4:
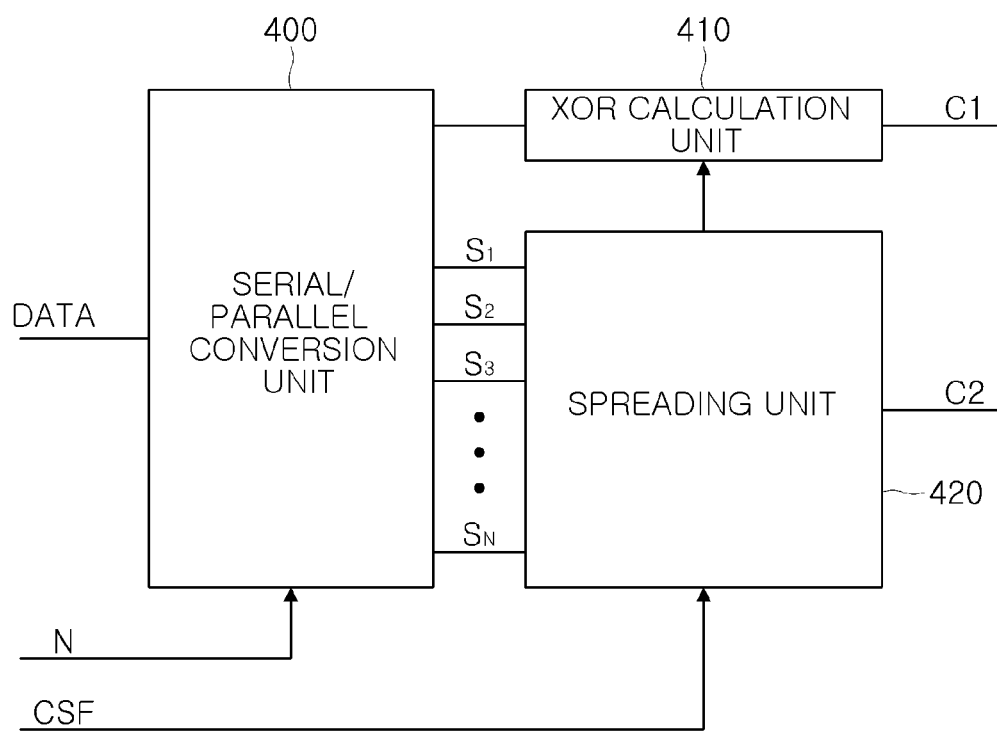
FIG. 4 is a block diagram showing a configuration corresponding to a combination of the first and second spreading operations of a phased spreading scheme-based transmission apparatus according to an embodiment of the present invention.

FIG. 4 is a block diagram showing a configuration corresponding to a combination of the first and second spreading operations of a phased spreading scheme-based transmission apparatus according to an embodiment of the present invention.

As shown in FIG. 4, the phased spreading scheme-based transmission apparatus may include a serial/parallel conversion unit 400, an XOR calculation unit 410, and a spreading unit 420, such that data for transmission thereby may be spread in phase, based on a first and a second spreading code.

With reference to FIG. 4, the serial/parallel conversion unit 400 may convert scrambled serial data for transmission thereby into the N-number of pieces of parallel data according to the control signal N defining a conversion ratio and may output the converted data. Here, the N-number of pieces of output parallel data may configure one data symbol. Further, when the control signal N has a value of '1' or '0', the serial/parallel conversion unit 400 may output serial data as it is to the XOR calculation unit 410 in order to spread data to be transmitted before network formation, that is, a signal for network formation, by using a first spreading code appropriate to a narrowband communications channel and transmit the spread data through the narrowband communications channel. Meanwhile, when the control signal N does not have a value of '1' or '0', but, for example, has a value of '4', the serial/parallel conversion unit 400 may convert the serial data into four pieces of parallel data and output the converted data to the spreading unit 420, in order to spread data to be transmitted after the network formation, by using a second spreading code appropriate to a high speed communications channel and transmit the spread data through the high speed communications channel.

The XOR calculation unit 410 may spread a data symbol from the serial/parallel conversion unit 400 by using the first spreading code provided from the spreading unit 420. As such, the data symbol spread by the first spreading code may be transmitted to the receiving device through the narrowband communications channel. At this time, when the data input from the serial/parallel conversion unit 400 has a value of '0', the XOR calculation unit 410 may spread a corresponding data symbol by using the first spreading code as it is. Meanwhile, when the data input from the serial/parallel conversion unit 400 has a value of '1', the XOR calculation unit 410 may invert a phase of the first spreading code and spread a corresponding data symbol by using the first spreading code having been inverted with regard to the phase thereof.

With respect to the spreading unit 420, when a code having a greatest number of transitions among spreading codes having orthogonality is previously defined as the first spreading code appropriate to the narrowband communications channel, a spreading coefficient defined by the control signal CSF is verified and then the verified spreading coefficient has a value of '1' or '0', the previously defined first spreading code may be provided to the XOR calculation unit 410. In addition, in the spreading unit 420, the N-number of pieces of parallel data may be received from the serial/parallel conversion unit 400, a spreading coefficient defined by the control signal CSF may be verified, spreading codes having orthogonality corresponding to the verified spreading coefficients may be generated, one of the generated spreading codes may be optionally selected as a second spreading code appropriate to a high speed communications channel, and then, a data symbol from the serial/parallel conversion unit 400 may be spread by using the second spreading code. Here, the spreading coefficient defined by the control signal CSF may be set to become M ($=2^N$) or more. As such, the data symbol spread by the second spreading code may be transmitted to the receiving device through the high speed communications channel. According to the embodiment of the present invention, the first spreading code may have a spreading coefficient of '1' or '0' and the second spreading code may have a '$2^N$' or greater spreading coefficient, greater than '1'.

Figure 5:
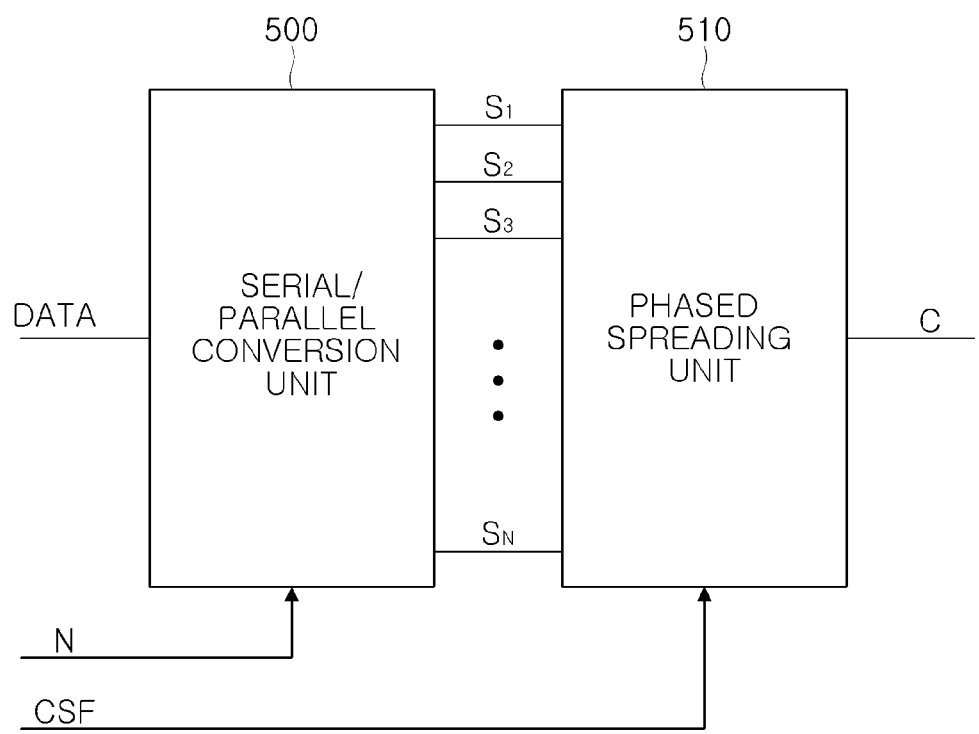
FIG. 5 is a block diagram showing another configuration corresponding to a combination of the first and second spreading operations of a phased spreading scheme-based transmission apparatus according to an embodiment of the present invention.

FIG. 5 is a block diagram showing another configuration corresponding to a combination of the first and second spreading operations of a phased spreading scheme-based transmission apparatus according to an embodiment of the present invention.

As shown in FIG. 5, the phased spreading scheme-based transmission apparatus may include a serial/parallel conversion unit 500 and a phased spreading unit 510, such that data for transmission thereby may be spread in phase, based on first and second spreading codes.

With reference to FIG. 5, the serial/parallel conversion unit 500 may convert scrambled serial data for transmission thereby into the N-number of pieces of parallel data according to the control signal N defining a conversion ratio and may output the converted data. Here, the N-number of pieces of output parallel data may configure one data symbol. Further, when the control signal N has a value of '1' or '0', the serial/parallel conversion unit 500 may output serial data as it is to the phased spreading unit 510 in order to spread data to be transmitted before network formation, that is, a signal for network formation, by using a first spreading code appropriate to a narrowband communications channel and transmit the spread data through the narrowband communications channel. Meanwhile, when the control signal N does not have a value of '1' or '0', but, for example, a value of '4', the serial/parallel conversion unit 500 may convert the serial data into four pieces of parallel data and output the converted data to the phased spreading unit 510, in order to spread the data to be transmitted after the network formation, by using a second spreading code appropriate to a high speed communications channel and transmit the spread data through the high speed communications channel.

With respect to the phased spreading unit 510, when a code having a greatest number of transitions among spreading codes having orthogonality is previously defined as the first spreading code appropriate to the narrowband communications channel, a spreading coefficient defined by the control signal CSF is verified and then the verified spreading coefficient has a value of '1' or '0', a data symbol from the serial/parallel conversion unit 500 may be spread by using the previously defined first spreading code. As such, the data symbol spread by the first spreading code may be transmitted to the receiving device through the narrowband communications channel. At this time, when the data input from the serial/parallel conversion unit 500 has a value of '0', the phased spreading unit 510 may spread a corresponding data symbol by using the first spreading code as it is. Meanwhile, when the data input from the serial/parallel conversion unit 500 has a value of '1', the phased spreading unit 510 may invert a phase of the first spreading code and spread a corresponding data symbol by using the first spreading code having been inverted with regard to a phase thereof.

In addition, in the phased spreading unit 510, the N-number of pieces of parallel data may be received from the serial/parallel conversion unit 500, a spreading coefficient defined by the control signal CSF may be verified, spreading codes having orthogonality corresponding to the verified spreading coefficients may be generated, one of the generated spreading codes may be optionally selected as the second spreading code appropriate to the high speed communications channel, and then, a data symbol from the serial/parallel conversion unit 500 may be spread by using the second spreading code. Here, the spreading coefficient defined by the control signal CSF may be set to become M ($=2^N$) or more. As such, the data symbol spread by the second spreading code may be transmitted to the receiving device through the high speed communications channel. According to the embodiment of the present invention, the first spreading code may have a spreading coefficient of '1' or '0' and the second spreading code may have a '$2^N$' or greater spreading coefficient, greater than '1'.

As such, the phased spreading unit 510 may spread a data symbol by selectively using first and second spreading codes, and the XOR calculation unit may also be added thereto so as to transfer a relatively large amount of information by using the same spreading code.

Meanwhile, though not shown in the drawings, a phased spreading scheme-based transmission apparatus according to an embodiment of the present invention may further include a preamble and header generation unit, a data generation unit, a scrambling unit and a multiplexing unit.

The preamble and header generation unit may generate a preamble for frame synchronization and a header configured of control information with regard to data for the transmission thereby, that is, transmission data.

The data generation unit may output the data for the transmission thereby, as serial data.

The scrambling unit may scramble the serial data output from the data generation unit. As such, the scrambled serial data may be output to the serial/parallel conversion unit.

The multiplexing unit may allow a preamble and header generated from the preamble and header generation unit, and transmission data spread by using the first or second spreading code by the XOR calculation unit or the spreading unit, to be multiplexed, and may output a frame configured thereby to be transmitted to the receiving device through a corresponding channel.

As described above, according to an embodiment of the present invention, the spreading codes appropriate to different channels may be generated through one spreading unit, and relatively simple network formation may be attained through a narrowband communications channel, that is, a human body channel, or a near field communications channel, that is, contact or near communications channel, in the first spreading operation; and a high speed data transmission may be obtained through a high speed communications channel or wireless communications channel in the second spreading operation. In other words, narrowband or near field communications technology, for example, Radio Frequency Identification (RFID) and a Near Field Communication (NFC) technologies, and a high speed or wireless communications technology, for example, Ultra Wideband (UWB) and a wireless local area network (WLAN), may be combined, and a signal necessary between the contact or adjacent devices and a signal necessary for the high speed wireless communications may be implemented by using a single MODEM. Here, in a case in which the channel used in the first spreading operation is the human body, a usable spreading code may be limited due to a limited bandwidth and an Inter Symbol Interference (ISI), and in a case in which the channel used in the second spreading operation is wireless, since a carrier wave is used therefor, the use thereof may be free from the limitation with respect to the spreading code like in the existing wireless case.

Figure 6:
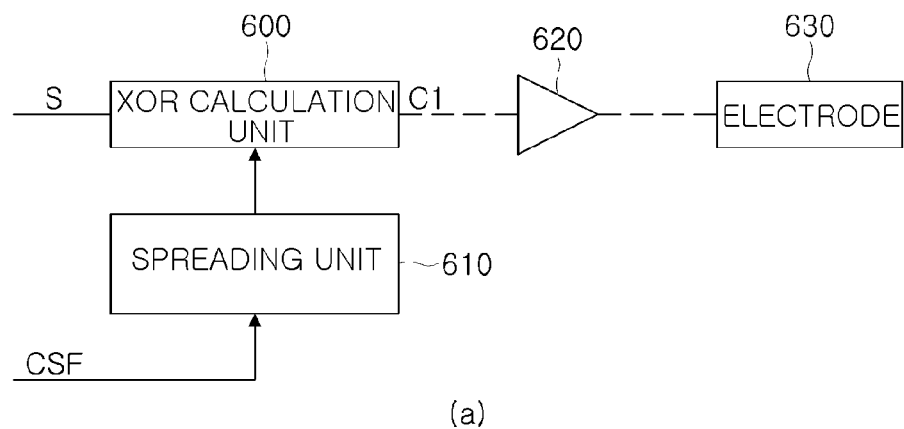
FIG. 6 is a block diagram showing a configuration corresponding to the first spreading operation or the second spreading operation of a phased spreading scheme-based transmission apparatus, and a conductive interface connected thereto, according to an embodiment of the present invention.
Figure 6:
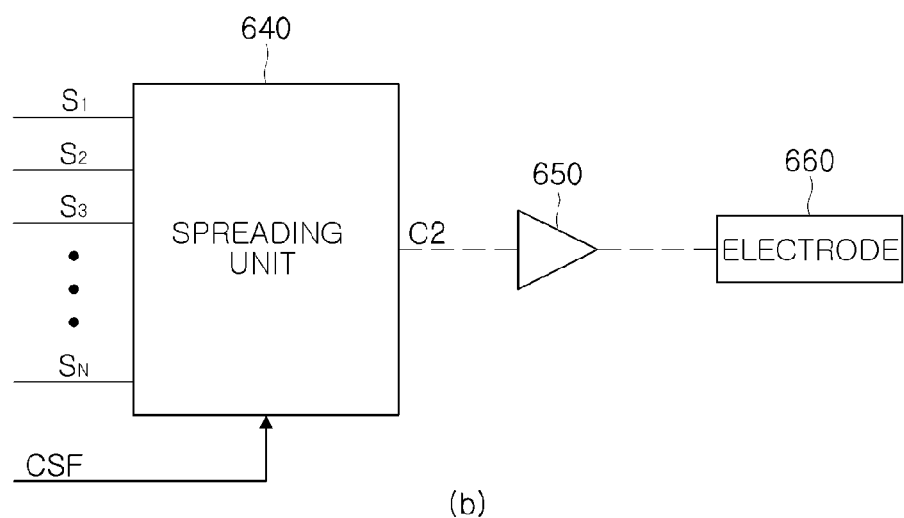

FIG. 6 is a block diagram showing a configuration corresponding to a first spreading operation or a second spreading operation of a phased spreading scheme-based transmission apparatus, and a conductive interface connected thereto, according to an embodiment of the present invention.

Referring to FIG. 6, an XOR calculation unit 600 and a spreading unit 610 shown in FIG. 6A are the same as the XOR calculation unit 100 and the spreading unit 110 of FIG. 1; and a spreading unit 640 of FIG. 6B is the same as the spreading unit 210 of FIG. 2. Therefore, a detailed description thereof will be omitted. The data symbol spread based on the first spreading code by the XOR calculation unit 600 or the data symbol spread based on the second spreading code by the spreading unit 640 may be output to buffers 620 and 650 respectively connected thereto. The buffer 620 or 650 may buffer the data symbol and then may transmit the buffered data symbol to the contact or adjacent device through a conductive interface.

The conductive interface is an interface used for the purpose of a signal transfer in the contact or adjacent area, and may have an electrode 630 or 660 or coupler type, and may include an insulator in order to limit a direct electric influence for a user. In addition, the conductive interface may be used in the communications transferring a signal through a channel having conductivity, and a filter for limiting a spectrum of an output signal, a driving circuit required to obtain electric power necessary for a signal transfer characteristic, or the like may be added thereto. In the same manner as a signal for network formation, that is, a signal for ID transmission, authentication or approval, in a case in which the magnitude of information transferred between devices connected to each other is relatively small, the transmission of corresponding information may be achieved with the first spreading code only.

Figure 7:
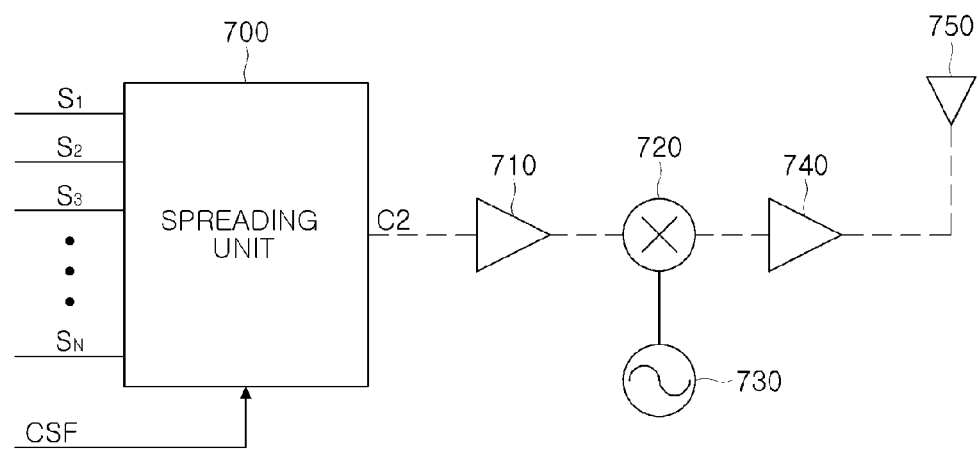
FIG. 7 is a block diagram showing a configuration corresponding to the second spreading operation of a phased spreading scheme-based transmission apparatus, and a wireless interface connected thereto, according to an embodiment of the present invention.

FIG. 7 is a block diagram showing a configuration corresponding to the second spreading operation of a phased spreading scheme-based transmission apparatus, and a wireless interface connected thereto, according to an embodiment of the present invention.

With reference to FIG. 7, the spreading unit 700 is the same as the spreading unit 210 of FIG. 2 and thus a detailed description thereof will be omitted. A data symbol spread based on the second spreading code by the spreading unit 700 may be output to a first buffer 710 connected thereto. The first buffer 710 may buffer the input data symbol and then output the buffered data symbol to a mixer 720. The mixer 720 may frequency-modulate the input data symbol, based on a carrier wave generated by an oscillator 730 and output the frequency-modulated data symbol to a second buffer 740. The second buffer 740 may buffer the input data symbol and then output the buffered data symbol to a receiving device through a wireless interface. The wireless interface may be an interface used for the purpose of information transfer at a relatively high speed and may have a Radio Frequency (RF) transceiver 750 type. In order to transfer information at a high speed, a relatively wide bandwidth is required. To this end, a carrier modulation scheme used in wireless communications.

Figure 8A:
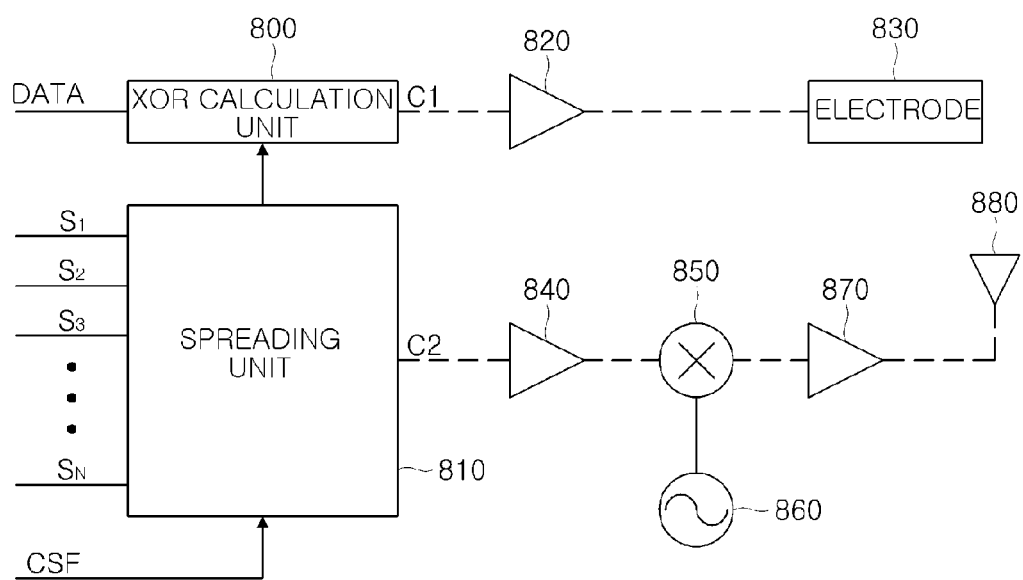
FIGS. 8A, 8B and 8C are block diagrams showing configurations corresponding to a combination of the first and second spreading operations of a phased spreading scheme-based transmission apparatus, and a conductive interface and a wireless interface respectively connected thereto, according to an embodiment of the present invention.
Figure 8B:
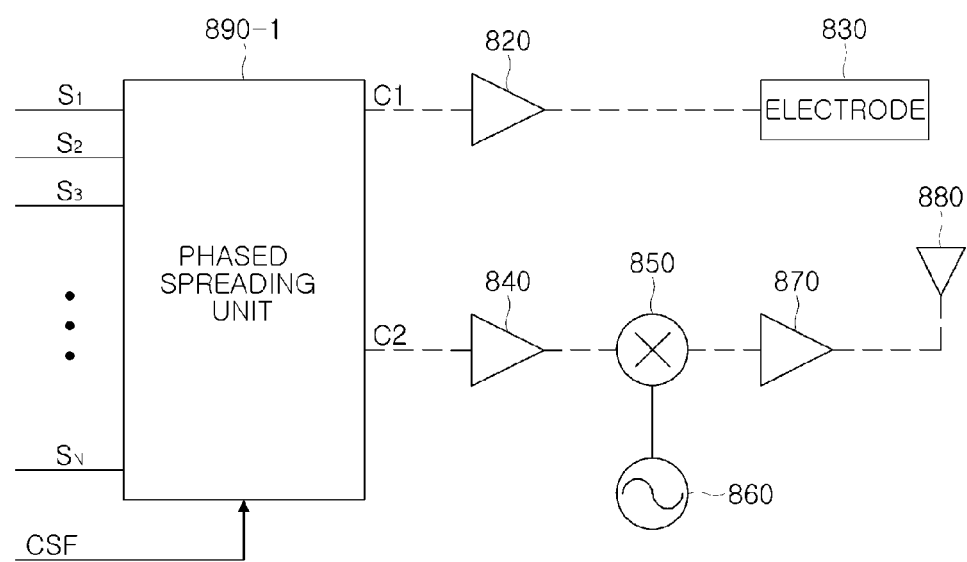
Figure 8C:
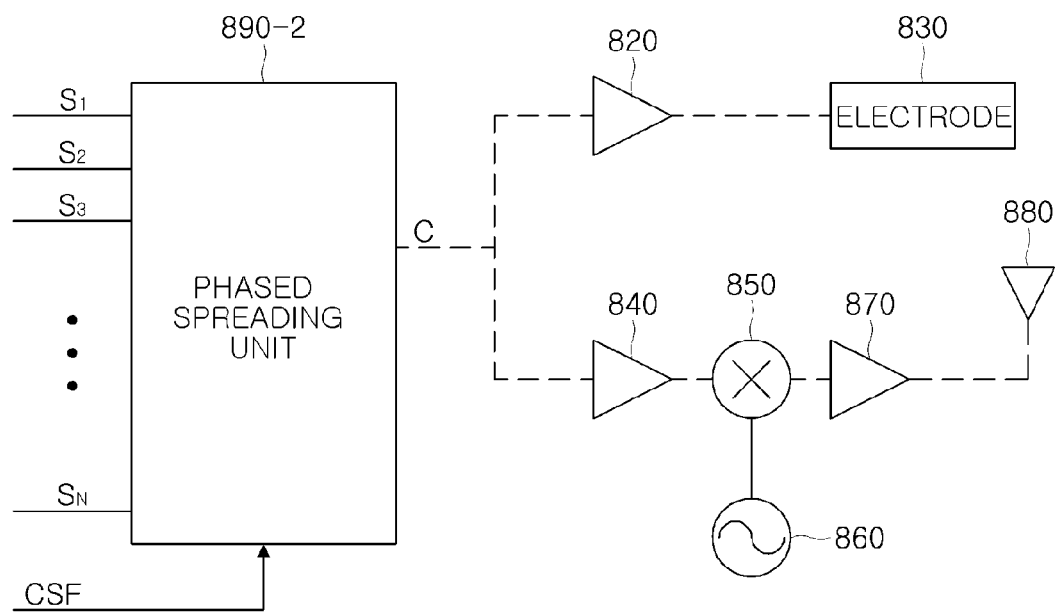

FIGS. 8A, 8B and 8C are block diagrams showing configurations corresponding to a combination of the first and second spreading operations of a phased spreading scheme-based transmission apparatus, and a conductive interface and a wireless interface respectively connected thereto, according to an embodiment of the present invention.

With reference to FIGS. 8A, 8B and 8C, an XOR calculation unit 800 and a spreading unit 810 of FIG. 8A are the same as the XOR calculation unit 410 and the spreading unit 420 of FIG. 4; and a phased spreading unit 890-1 of FIG. 8B and the phased spreading unit 890-2 of FIG. 8C are the same as the phased spreading unit 510 of FIG. 5, and thus, a detailed description thereof will be omitted.

Here, the data symbol spread based on the first spreading code by the XOR calculation unit 800 or the phased spreading unit 890-1 or 890-2 may be output to a first buffer 820 connected thereto. The first buffer 820 may buffer the input data symbol and then may transmit the buffered data symbol to a contact or adjacent device through a conductive interface. The conductive interface may have an electrode 830 or coupler type.

A data symbol spread based on the second spreading code by the spreading unit 810 or the phased spreading unit 890-1 or 890-2 may be output to a second buffer 840 connected thereto. The second buffer 840 may buffer the input data symbol and then output the buffered data symbol to a mixer 850. The mixer 850 may frequency-modulate the input data symbol, based on a carrier wave generated by an oscillator 860 and output the frequency-modulated data symbol to a third buffer 870. The third buffer 870 may buffer the input data symbol and then output the buffered data symbol to a receiving device through a wireless interface. The wireless interface may have an RF transceiver 880 type.

Figure 9:
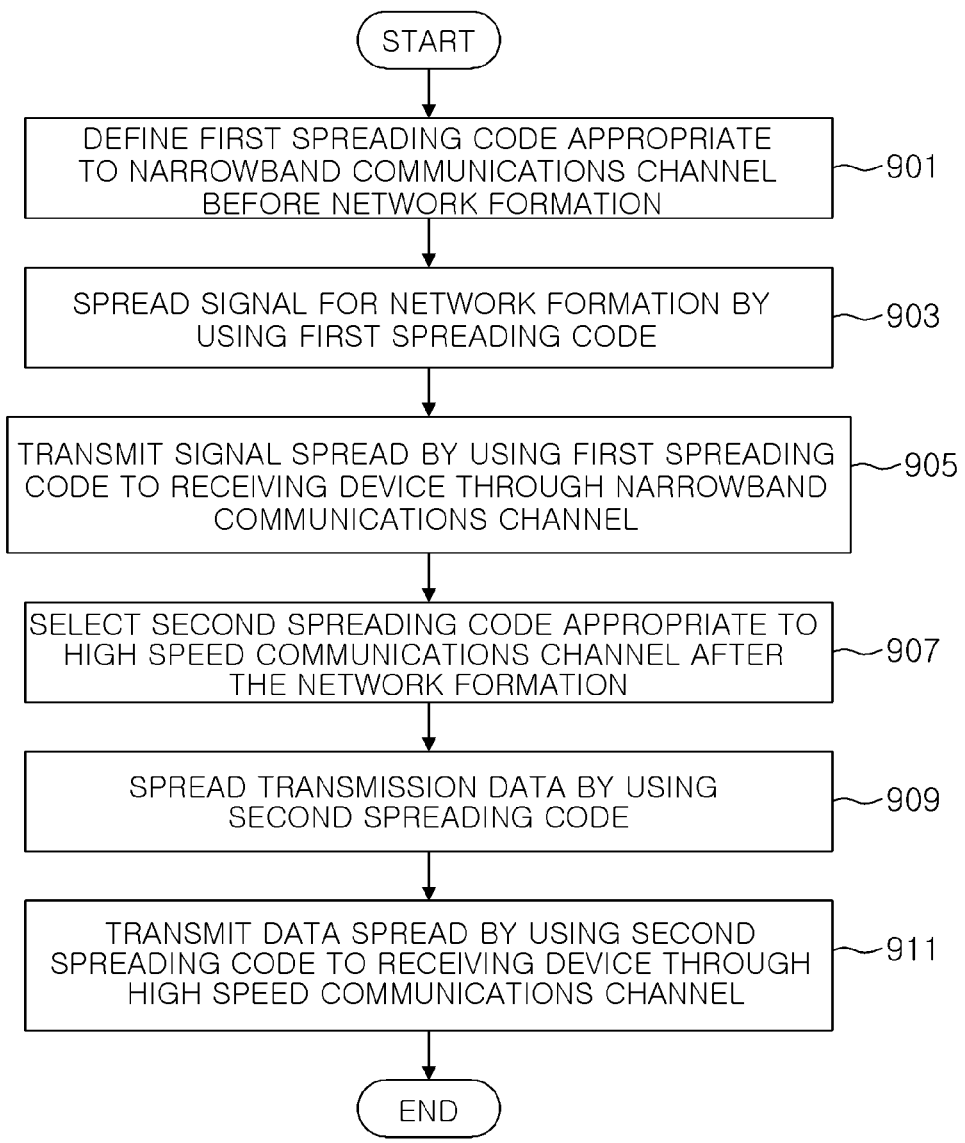
FIG. 9 is a flowchart illustrating a method of operating a phased spreading scheme-based transmission apparatus according to an embodiment of the present invention.

FIG. 9 is a flowchart illustrating a method of operating a phased spreading scheme-based transmission apparatus according to an embodiment of the present invention.

Referring to FIG. 9, according to an embodiment of the present invention, a transmitting device may previously define a code having a greatest number of transitions among spreading codes having orthogonality, as a first spreading code appropriate to a narrowband communications channel, before network formation, in operation 901. According to an embodiment of the present invention, the first spreading code may be previously defined as a spreading code having a greatest number of transitions in a time region or a spreading code group including the same; or may be previously defined as a spreading code having a greatest number of transitions in a time region among spreading codes having orthogonality or a spreading code group including the same. Whereby, the first spreading code may have a narrow band frequency spectrum.

Subsequently, the transmitting device may spread a signal for network formation by using the previously defined first spreading code according to a control signal defining a spreading coefficient in operation 903.

Next, the transmitting device may transmit the signal spread by using the first spreading code to a receiving device through a narrowband communications channel in operation 905.

Thereafter, the transmitting device may select a second spreading code appropriate to a high speed communications channel, based on the control signal defining a spreading coefficient, after the network formation in operation 907. Here, the transmitting device may verify a spreading coefficient defined by a control signal CSF, generate spreading codes having orthogonality corresponding to the verified spreading coefficients, and optionally select one of the generated spreading codes as a second spreading code appropriate to a high speed communications channel. Here, the spreading coefficient defined by the control signal CSF may be set to become M ($=2^N$) or more, wherein M is the number of pieces of parallel data converted according to serial/parallel conversion of data for the transmission thereby.

Then, the transmitting device may spread transmission data by using the selected second spreading code in operation 909.

Next, the transmitting device may transmit the data spread by using the second spreading code to the receiving device through a high speed communications channel in operation 911. Here, the first and second spreading codes may have different coefficients. In addition, the first spreading code may be configured to have a length equal to that of the second spreading code and may also be configured to be longer or shorter than that of the second spreading code.

Then, the transmitting device may finish an algorithm according to the embodiment of the present invention.

Meanwhile, the present invention describes the cases in which the first and second spreading codes have different spreading coefficients by way of example, but the first and second spreading codes may also have the same spreading coefficient and differing amounts of spreading codes. That is, cases in which the same spreading coefficient is provided in the first and second spreading operations, and a spreading code having a greatest number of transitions and a spreading code having a second greatest number of transitions are used may be considered, instead of only using a single spreading code in the first spreading operation. For example, when a spreading coefficient is 64, two codes of W63 and W62 having a greatest number of transitions may be used in the first spreading operation, and more spreading codes, as compared thereto, may be used in the second spreading operation, such that high speed communications may be achieved. In this case, two spreading operations may be performed using the same spreading coefficient and a transmission speed thereof may be controlled by adjusting the number of spreading coefficients.

As described above, in a phased spreading scheme-based transmission apparatus and a method of operating the same according to an embodiment of the present invention, in which a first spreading code is defined, the defined first spreading code is transmitted to a receiving device, a second spreading code is selected according to a spreading coefficient, and the selected second spreading code is transmitted to the receiving device; a defect according to the related art in which complicated operations such as wireless network search and selection, or the like, for network formation are required may be solved. That is, two devices to be connected to each other by a user may be in contact with or adjacent to each other, thereby resulting in a relatively easy connection thereof.

As set forth above, according to an embodiment of the present invention, a phased spreading scheme-based transmission apparatus and a method of operating the same.

While the present invention has been shown and described in connection with the embodiments, it will be apparent to those skilled in the art that modifications and variations can be made without departing from the spirit and scope of the invention as defined by the appended claims.

What is claimed is:

1. A phased spreading scheme-based transmission apparatus comprising:
    a spreading unit performing a first spreading operation of defining a first spreading code and spreading an input signal by using the defined first spreading code in response to a control signal defining a spreading coefficient, and a second spreading operation of selecting a second spreading code based on the control signal defining the spreading coefficient and spreading an input signal by using the selected second spreading code,
    the first and second spreading codes having different spreading coefficients.

2. The phased spreading scheme-based transmission apparatus of claim 1, wherein the first spreading code has a narrow band frequency spectrum.

3. The phased spreading scheme-based transmission apparatus of claim 2, wherein the first spreading code is a spreading code having a greatest number of transitions in a time region or a spreading code group including the same, or a spreading code having a greatest number of transitions in the time region among spreading codes having orthogonality or a spreading code group including the same.

4. The phased spreading scheme-based transmission apparatus of claim 1, further comprising a phase inverter inverting a phase of the first spreading code in response to the input signal, the phase inverter being implemented by using an exclusive OR (XOR) calculation unit.

5. The phased spreading scheme-based transmission apparatus of claim 1, further comprising a serial/parallel conversion unit converting pieces of serial data into pieces of parallel data for transmission thereby.

6. A phased spreading scheme-based transmission apparatus comprising:
    a spreading unit having a first spreading operation of defining a first spreading code and spreading an input signal by using the defined first spreading code in response to a control signal defining a spreading coefficient, and a second spreading operation of selecting a second spreading code based on the control signal defining the spreading coefficient and spreading an input signal by using the selected second spreading code,
    the first and second spreading codes having the same spreading coefficient and differing amounts of spreading codes.

7. The phased spreading scheme-based transmission apparatus of claim 6, wherein the first spreading code has a narrow band frequency spectrum.

8. The phased spreading scheme-based transmission apparatus of claim 7, wherein the first spreading code is a spreading code having a greatest number of transitions in a time region or a spreading code group including the same, or a spreading code having a greatest number of transitions in the time region among spreading codes having orthogonality or a spreading code group including the same.

9. The phased spreading scheme-based transmission apparatus of claim 6, further comprising a phase inverter inverting a phase of the first spreading code in response to the input signal, the phase inverter being implemented by using an XOR calculation unit.

10. The phased spreading scheme-based transmission apparatus of claim 6, further comprising a serial/parallel conversion unit converting pieces of serial data into pieces of parallel data for transmission thereby.

11. A method of operating a phased spreading scheme-based transmission apparatus, comprising:
    defining a first spreading code;
    transmitting the defined first spreading code to a receiving device;
    selecting a second spreading code according to a spreading coefficient; and
    transmitting the selected second spreading code to the receiving device,
    the first and second spreading codes having different spreading coefficients.

12. The method of claim 11, wherein the first spreading code has a narrowband frequency spectrum.

13. The method of claim 12, wherein the first spreading code is a spreading code having a greatest number of transitions in a time region or a spreading code group including the same, or a spreading code having a greatest number of transitions in the time region among spreading codes having orthogonality or a spreading code group including the same.

14. The method of claim 11, further comprising inverting a phase of the first spreading code in response to the input signal, the phase being inverted through an XOR calculation.

15. The method of claim 11, further comprising converting pieces of serial data into pieces of parallel data for transmission thereby.

16. A method of operating a phased spreading scheme-based transmission apparatus, comprising:
    defining a first spreading code;
    transmitting the defined first spreading code to a receiving device;
    selecting a second spreading code according to a spreading coefficient; and
    transmitting the selected second spreading code to the receiving device,
    the first and second spreading codes having the same spreading coefficient and the differing amounts of spreading codes.

17. The method of claim 16, wherein the first spreading code has a narrowband frequency spectrum.

18. The method of claim 17, wherein the first spreading code is a spreading code having a greatest number of transitions in a time region or a spreading code group including the same, or a spreading code having a greatest number of transitions in the time region among spreading codes having orthogonality or a spreading code group including the same.

19. The method of claim 16, further comprising inverting a phase of the first spreading code in response to the input signal, the phase being inverted through an XOR calculation.

20. The method of claim 16, further comprising converting pieces of serial data into pieces of parallel data for transmission thereby.

* * * * *